(12) United States Patent
Kim

(10) Patent No.: US 8,662,266 B2
(45) Date of Patent: Mar. 4, 2014

(54) ELECTROMOTIVE ACTIVE DYNAMIC VIBRATION ABSORBER APPARATUS FOR VEHICLE

(75) Inventor: Jang-Ho Kim, Buchun-shi (KR)

(73) Assignee: Hyundai Motor Company, Seoul (KR)

( * ) Notice: Subject to any disclaimer, the term of this patent is extended or adjusted under 35 U.S.C. 154(b) by 617 days.

(21) Appl. No.: 12/912,463

(22) Filed: Oct. 26, 2010

(65) Prior Publication Data

US 2011/0316363 A1 Dec. 29, 2011

(30) Foreign Application Priority Data

Jun. 29, 2010 (KR) ........................ 10-2010-0062123

(51) Int. Cl.
*F16F 6/00* (2006.01)

(52) U.S. Cl.
USPC ...................................... 188/380; 267/140.14

(58) Field of Classification Search
USPC ........ 267/140.14, 140.15; 188/378, 379, 380; 310/24, 30
See application file for complete search history.

(56) References Cited

U.S. PATENT DOCUMENTS

| | | | | |
|---|---|---|---|---|
| 6,105,943 | A * | 8/2000 | Nagasawa | ................ 267/140.14 |
| 6,305,675 | B1 * | 10/2001 | Muramatsu | ............... 267/140.14 |
| 6,315,277 | B1 * | 11/2001 | Nagasawa | ................ 267/140.14 |
| 6,406,010 | B1 * | 6/2002 | Yano et al. | ................ 267/140.14 |
| 6,527,262 | B2 * | 3/2003 | Hagino et al. | ........... 267/140.14 |
| 7,165,761 | B2 * | 1/2007 | Muraoka et al. | ......... 267/140.14 |
| 7,255,335 | B2 * | 8/2007 | Muraoka et al. | ......... 267/140.14 |
| 8,047,513 | B2 * | 11/2011 | Muraoka et al. | ......... 267/140.14 |
| 8,401,735 | B2 * | 3/2013 | Muragishi et al. | .............. 701/37 |
| 2005/0275145 | A1 * | 12/2005 | Muraoka et al. | ......... 267/140.14 |
| 2008/0007125 | A1 * | 1/2008 | Koyama et al. | .................. 310/27 |
| 2011/0057367 | A1 * | 3/2011 | Hasegawa et al. | ....... 267/140.14 |

FOREIGN PATENT DOCUMENTS

| | | |
|---|---|---|
| JP | 2000-35083 A | 2/2000 |
| JP | 2000-58319 A | 2/2000 |
| JP | 2002-106633 A | 4/2002 |
| JP | 2009-273224 A | 11/2009 |
| JP | 2010-14174 A | 1/2010 |

\* cited by examiner

*Primary Examiner* — Bradley King
(74) *Attorney, Agent, or Firm* — Morgan, Lewis & Bockius LLP

(57) ABSTRACT

An electromotive active vibration absorber apparatus mounted to a vehicle to attenuate vibration of the vehicle may include elastic members mounted to an housing, an inner yoke having an upper yoke part and a lower yoke part which are fastened to the elastic members respectively, wherein an inner magnetic substance is disposed between the upper and lower yoke parts, and an outer yoke enclosing the inner yoke and having top and bottom portions dented to form inner and outer support members and a connector spoke and receive coil units therein, wherein the coil units include an upper coil unit and a lower coil unit, the upper coil unit being mounted above the connector spoke and the lower coil unit being mounted under the connector spoke respectively, between the inner and outer support members of the outer yoke, and wherein the coil units are controlled to vibrate the inner yoke when power is applied thereto.

12 Claims, 9 Drawing Sheets

DIRECTION OF MAGNETIC FORCE LINE PASSING COIL UNIT O

DIRECTION OF MAGNETIC FORCE LINE PASSING COIL UNIT X though the

ELECTROMOTIVE ACTIVE DYNAMIC VIBRATION ABSORBER APPARATUS FOR VEHICLE

CROSS-REFERENCE TO RELATED APPLICATION

The present application claims priority to Korean Patent Application No. 10-2010-62123, filed on Jun. 29, 2010, the entire contents of which is incorporated herein for all purposes by this reference.

BACKGROUND OF THE INVENTION

1. Field of the Invention

The present invention relates to an electromotive active dynamic vibration absorber apparatus for a vehicle, and more particularly, to an electromotive active dynamic vibration absorber apparatus for a vehicle having improved performance by disposing coil units in the up-down direction.

2. Description of Related Art

Researches and studies have been conducted to attenuate vibration, because the vibration is generated in vehicles due to operation of the engine.

Dynamic vibration absorbers are devices reducing the amplitude of vibration by intentionally producing anti-node against generated vibration and have been widely used as device for attenuating vibration of vehicles.

The dynamic vibration absorbers implement a mass-spring system. Further, in the dynamic vibration absorbers, a device that senses generated vibration and attenuates the vibration by adjusting the amplitude and cycle in accordance with the amplitude and frequency is called an active dynamic vibration absorber. The active dynamic vibration absorber includes a dynamic vibration absorber, which is a mass-spring system, and a sensor and a unit which can reciprocate the vibration absorber, using electrical energy.

Referring to FIG. 1A, vibration of an engine is transmitted to a chassis through an engine mount, such that the vehicle body entirely is vibrated. Although the vibration is attenuated at a predetermined level across the engine mount, it is not satisfactory. Therefore, an active vibration absorber apparatus is additionally installed to attenuate the vibration that is transmitted from the engine. As shown in the figure, the active vibration absorber apparatus includes, in addition to a vibration absorber, an accelerometer that senses the magnitude and direction of vibration of the chassis, a controller that senses the RPM of the engine and controls the active vibration absorber in response to a signal from the accelerometer, and an amplifier that amplifies an electric signal transmitted from the controller.

As shown at the right in the figure, the active vibration absorber apparatus having this configuration has an effect of attenuating the vibration from the chassis by controlling the vibration absorber to generate vibration having a phase opposite to the vibration that is generated from the engine and transmitted through the engine mount. Since the active vibration absorber apparatus having the configuration can generate vibration having the inverse phase in accordance with vibration differently generated in accordance with the RPM of the engine, it is possible to more effectively control the vibration of the engine even in high-speed and low-speed traveling of the vehicle.

In an active vibration absorber apparatus, a vibration absorber that includes a coil unit wound therein to vibrate in response to an electric signal and a yoke assembly moved by electric force, when electricity is generated by coils, and having a predetermined weight therein. The yoke assembly is moved in different directions by force that is continuously applied and leaf springs are fastened to the top and the bottom of the yoke to convert the movement into vibration.

FIG. 1B is a cross-sectional view showing a vibration absorber of the related art, in which leaf springs 2a, 2b are attached to a yoke assembly 3. Referring to the figure, the yoke assembly 3 having upper and lower protrusions where the leaf springs 2a, 2b are attached, and the leaf springs 2a, 2b are fastened to a housing 4 to transmit vibration. However, a coil unit 1 that vibrates the yoke assembly 3 by generating a magnetic field is disposed only at the upper potion in this structure. Therefore, the magnetic field is generated only at one side, which should be overcome.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a vibration absorber that more effectively and efficiently generates vibration.

In an aspect of the present invention, the electromotive active vibration absorber apparatus mounted to a vehicle to attenuate vibration of the vehicle may include elastic members mounted to an housing, an inner yoke having an upper yoke part and a lower yoke part which are fastened to the elastic members respectively, wherein an inner magnetic substance is disposed between the upper and lower yoke parts, and an outer yoke enclosing the inner yoke and having top and bottom portions dented to form inner and outer support members and a connector spoke and receive coil units therein, wherein the coil units include an upper coil unit and a lower coil unit, the upper coil unit being mounted above the connector spoke and the lower coil unit being mounted under the connector spoke respectively, between the inner and outer support members of the outer yoke, and wherein the coil units are controlled to vibrate the inner and outer yokes when power is applied thereto.

The connector spoke may be a solid connector spoke formed between the inner and outer support members.

The connector spoke may be formed of a plurality of connector spokes formed between the inner and outer support members and holes are formed between the connector spokes.

A fitting groove may be formed on the outer circumference of the outer support member and an outer magnetic substance is mounted in the fitting groove such that the inner magnetic substance, the coil units and the outer magnetic substance are disposed in series in a radial direction of the vibration absorber apparatus.

The coil units may include an upper coil housing and a lower coil housing inserted above and under the connector spoke between the inner and outer support members, wherein the upper coil housing has a plurality of holes formed through a lateral surface thereof, wherein the plurality of holes are formed through the lateral surface thereof in a length ranging above the height of the outer support member, and wherein the lower coil housing has a plurality of holes formed through a lateral surface thereof The outer yoke may be made up of nonmagnetic material.

Insulation members may be mounted to the upper and lower yoke parts and are fastened to the elastic members, wherein the insulation members are made up of nonmagnetic material.

According to the electromotive active vibration absorber apparatus for a vehicle having the above configuration, since coil units are disposed above and under the yoke assembly, it is possible to more efficiently vibrate the yoke assembly and more easily control the vibration. Further, this effect can be more improved by disposing an outer magnetic substance.

Since the connector spokes are spaced apart form each other such that the holes are formed in the up-down direction in the outer yoke, the yoke assembly can be more efficiently vibrated by interaction of the magnetic force lines generated by the upper coil unit and the lower coil unit.

Further, a coil housing is provided to protect the coil unit from the vibration, and the upper end and the lower end of the yoke assembly are made of a nonmagnetic substance, thereby adjusting the range where the magnetic field is formed. It is possible to prevent from external devices from being influenced by the magnetic force by limiting the magnetic field.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1A:
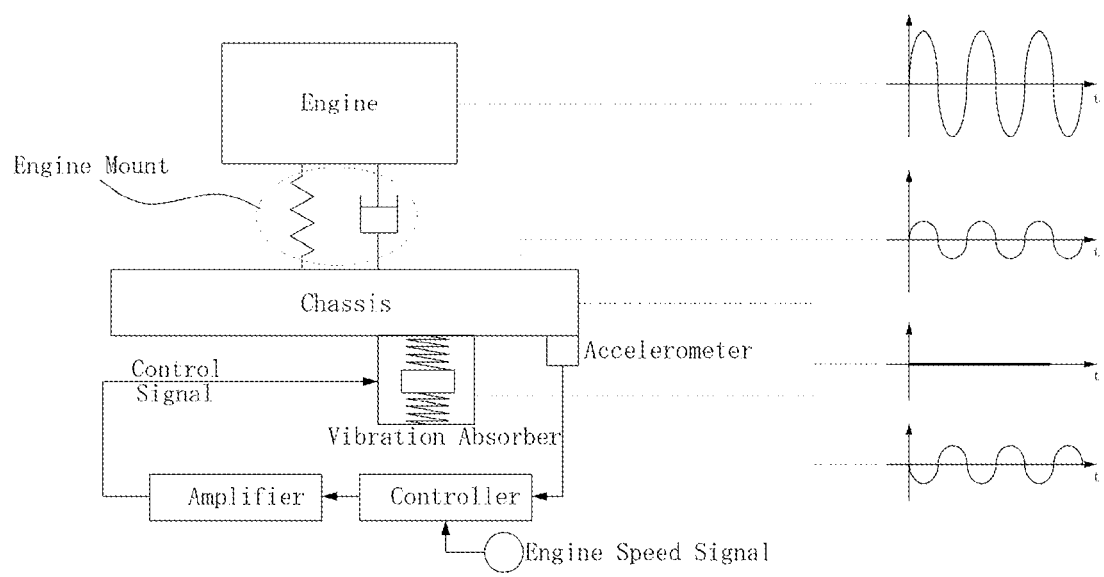
FIG. 1A is a diagram illustrating the configuration of an active vibration absorber apparatus of the related art installed in a vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The structure of a vibration absorber in an electromotive active vibration absorber apparatus according to an exemplary embodiment of the present invention is described hereafter in detail with reference to the accompanying drawings.

Figure 1B:
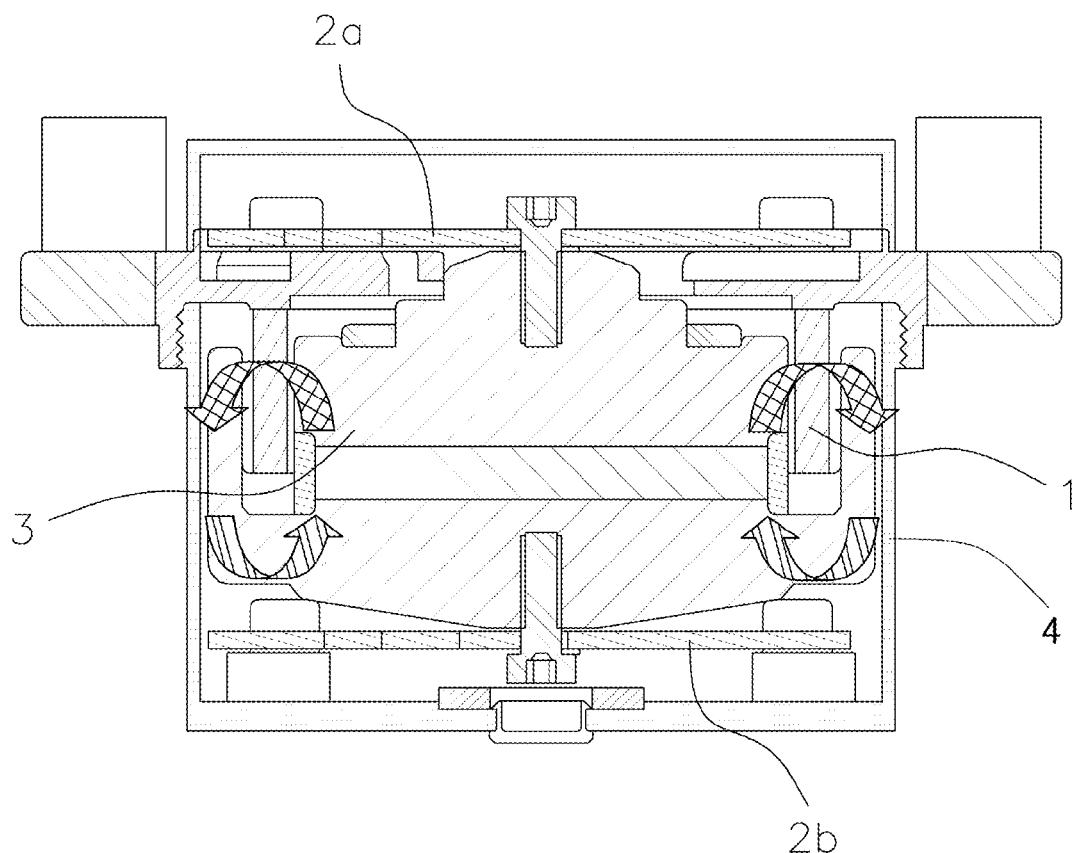
FIG. 1B is a cross-sectional view of a vibration absorber of the related art.
Figure 1B:
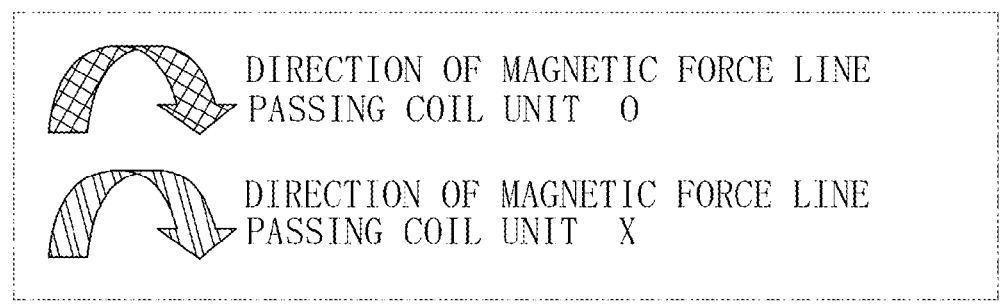

The vibration absorber according to an exemplary embodiment of the present invention is mounted on the chassis of a sub-frame of vehicles and vibrates in response to an electric signal from a controller or an amplifier, as described above. The vibration absorber shown in FIG. 2 includes a housing (as shown in FIG. 1B) which accommodates a leaf spring and yoke assembly, but the housing is not shown for a more simple and clear figure.

In the vibration absorber, leaf springs 60, 70 are fixed in parallel in the housing and the yoke assembly is mounted between the leaf springs 60, 70. Further, a coil unit that vibrates the yoke assembly is fixed in the housing.

The yoke assembly includes: a cylindrical inner yoke 10 having a circular plate-shaped inner magnetic substance 10c at the center and having the upper end and the lower end where the leaf springs 60, 70 are connected; and a cylindrical outer yoke 20 having the top and bottom open such that the inner yoke 10 can be inserted therein.

The inner yoke 10 has the upper end and the lower end of which the longitudinal centers protrude up and down, respectively, and fastened to the leaf springs 60, 70 by bolts, respectively, and the leaf springs 60, 70 are fixed in the housing. Further, the inner magnetic substance 10c is a permanent magnet, and an upper yoke part 10a and a lower yoke part 10b respectively connected to the top and the bottom of the inner magnetic substance 10c are made of metal to be magnetized.

Figure 2:
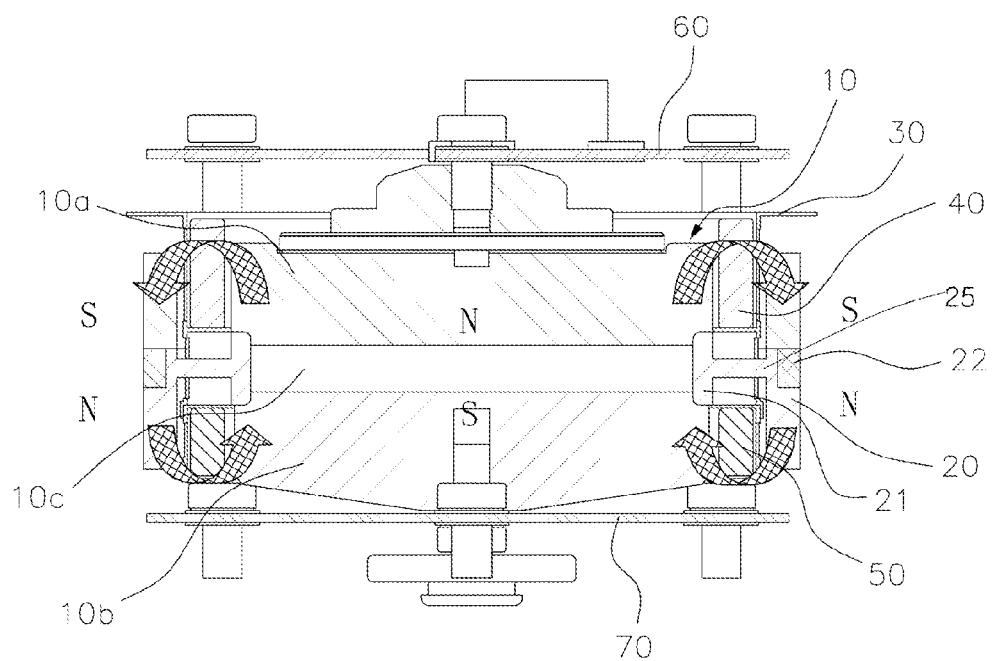
FIG. 2 is a cross-sectional view of a vibration absorber according to an exemplary embodiment of the present invention.
Figure 2:
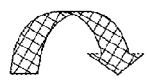
Figure 2:
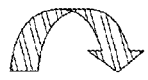

The upper yoke part 10a, the lower yoke part 10b, and the inner magnetic substance 10c define a depression where a inner support member 21 of the outer yoke 20 can be fitted and fixed. For reference, a female thread is formed on the inner circumference of the inner support member 21 and a male thread is formed on the edges of the upper yoke part 10a and the lower yoke part 10b, such that, as shown in FIG. 2, the upper yoke part 10a and the lower yoke part 10b can be easily combined, with the inner magnetic substance 10c therebetween.

Meanwhile, the outer yoke 20 has the inner support member 21, which has a ring shape, therein to support the inner magnetic substance 10c and a groove is formed around the outer circumference with an outer support member 25, such that an outer magnetic substance 22 is mounted in the groove. In this configuration, it is preferable that the outer portion where the outer magnetic substance 22 is mounted is made of metal that is magnetized and the inner and outer support members 21 and 25 are made of a nonmagnetic material. The outer yoke 20 having this configuration generates the magnetic force lines indicated by arrows, as shown in the figure, by arranging the outer magnetic substance 22 with the poles opposite to those of the inner magnetic substance 10c.

Meanwhile, a predetermined space is defined at the upper portion and the lower portion between the inner yoke 10 and the outer yoke 20 and coil units are disposed in the spaces. That is, an upper coil unit 40 and a lower coil unit 50 are arranged up and down in parallel. The upper coil unit 40 and the lower coil unit 50 are fixed to the housing in order not to vibrate. The coil unit includes a coil wound a predetermined number of time such that current flows through the controller and the amplifier, which are described above.

Figure 3:
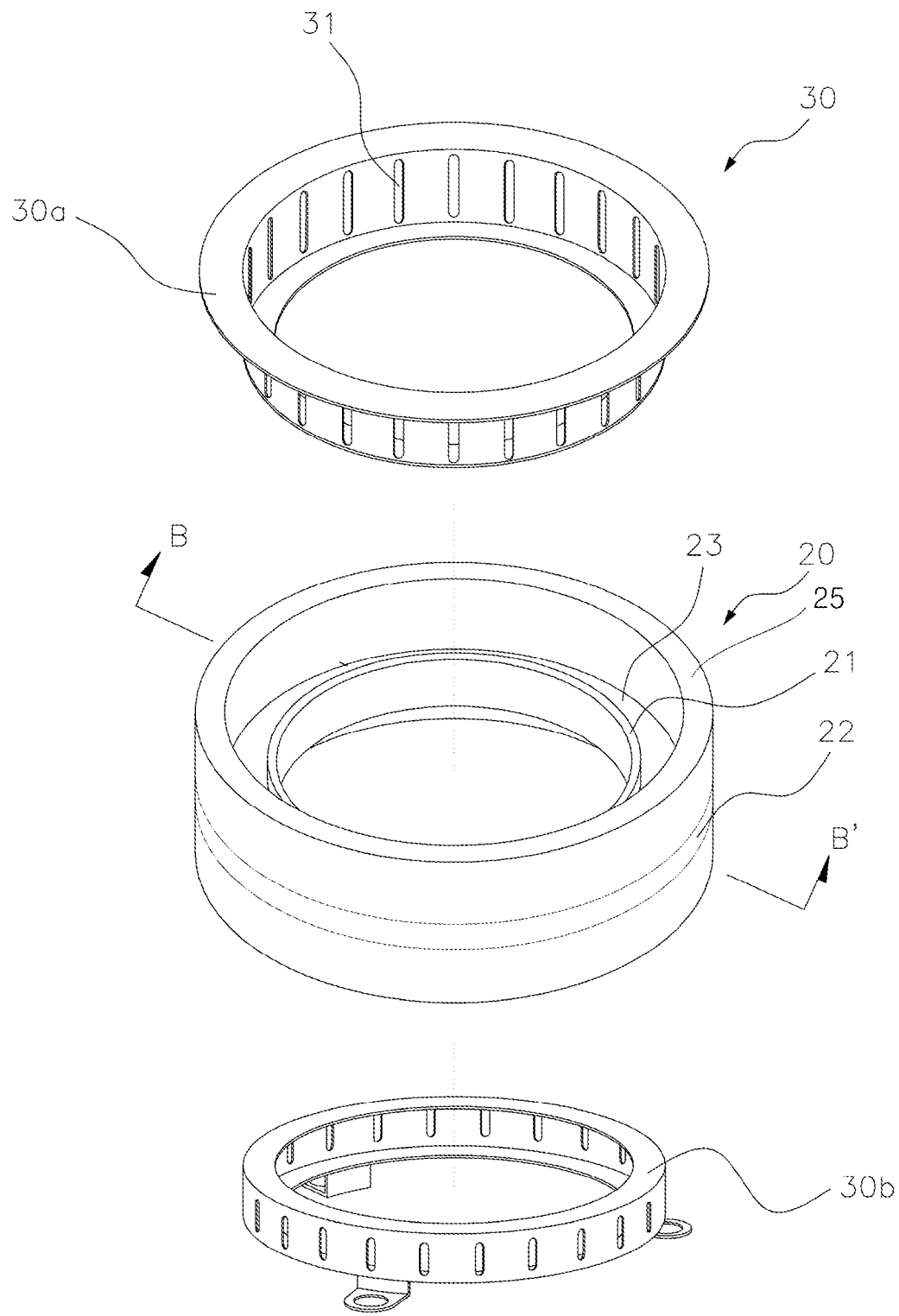
FIG. 3 is a perspective view illustrating that a coil housing is combined with an external yoke according to an exemplary embodiment of the present invention.
Figure 4:
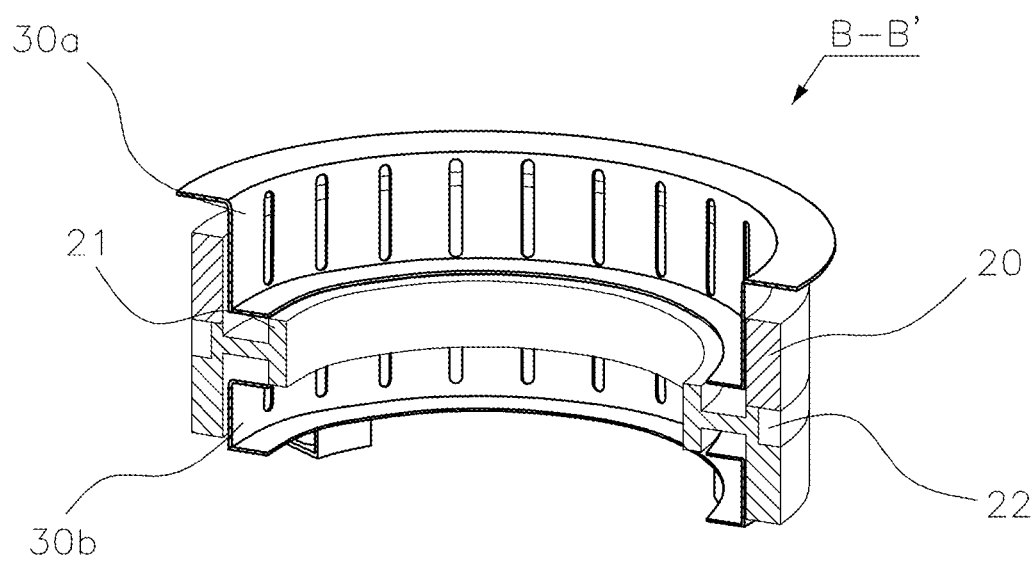
FIG. 4 is a cross-sectional view taken along line A-A' after the coil housing is combined in FIG. 3.

On the other hand, as shown in FIGS. 3 and 4, the vibration absorber according to an exemplary embodiment of the present invention further includes a coil housing 30 protecting the coil units and facilitating discharge of heat, when the yoke assembly vibrates. The coil housing 30 may be disposed above and under the outer yoke 20 and divided into an upper coil housing 30a and a lower coil housing 30b. Further, a plurality of holes 31 is formed along the circumference of the coil housing 30 to facilitate discharge of heat due to vibration of the yoke assembly.

In more detail, when the coil housing 30 is formed by combining the upper coil housing 30a with the lower coil housing 30b, which are independently manufactured, as shown in FIGS. 3 and 4, it is preferable to integrally form the outer portion mounted with the outer magnetic substance 22 with a connector spoke 23 connected with the inner and outer support members 21 and 25 in the outer yoke 20 (without forming holes therebetween).

Figure 5A:
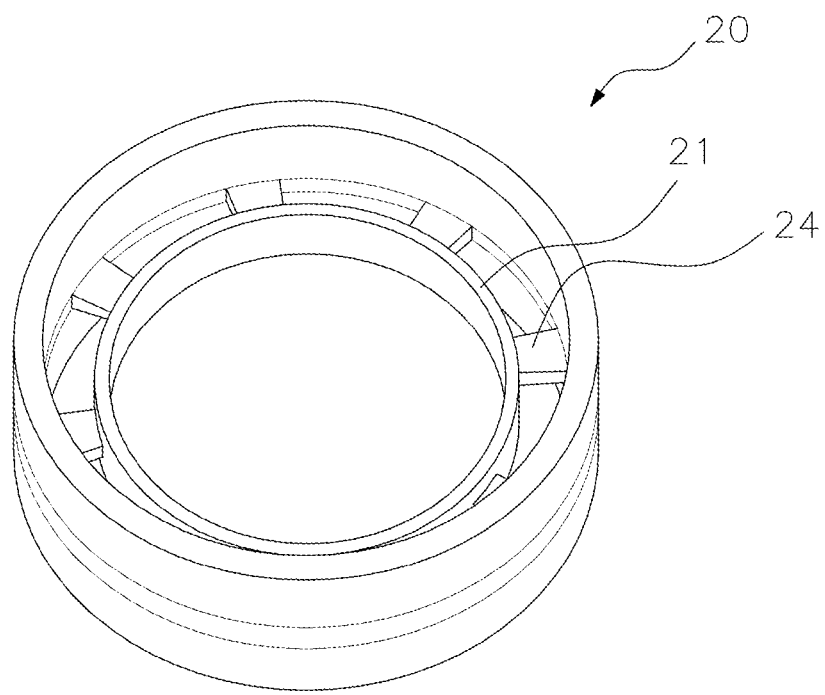
FIG. 5A is a perspective view of an external housing according to another exemplary embodiment of the present invention.
Figure 5B:
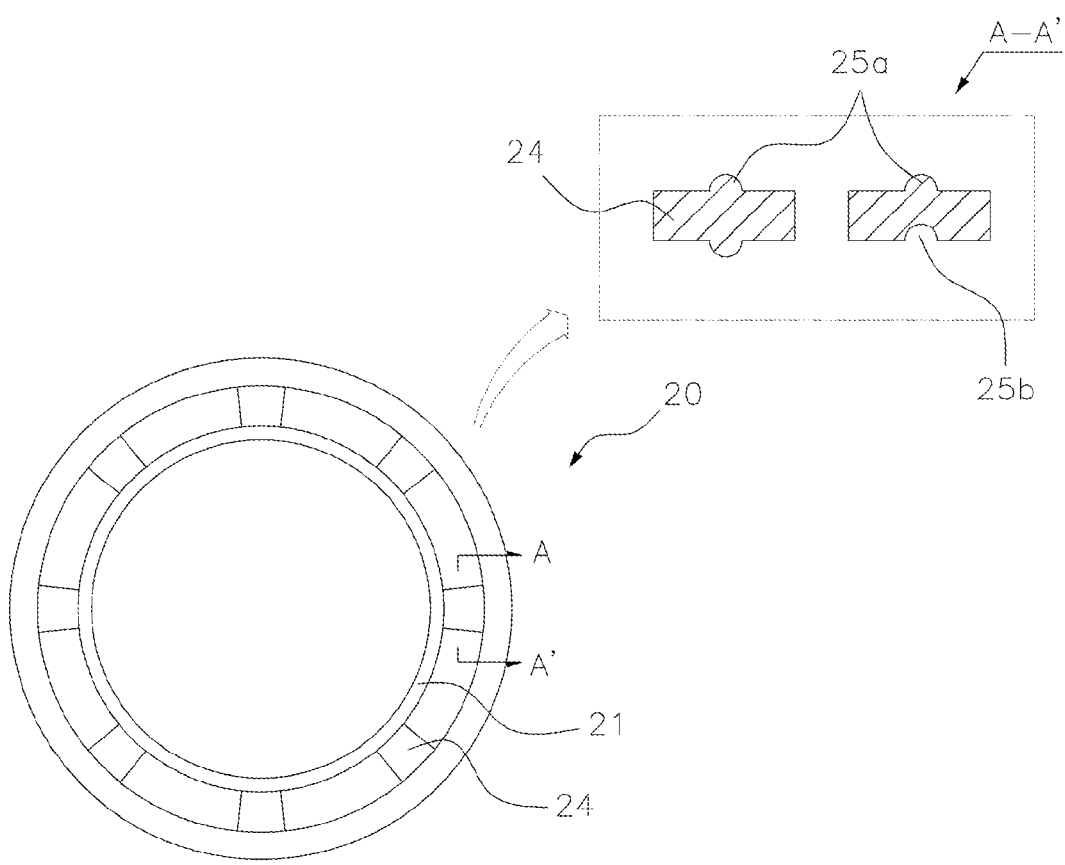
FIG. 5B shows a plan view and a cross-sectional view taken along line B-B' of an external housing according to another exemplary embodiment of the present invention.

A plurality of connector spokes 24 may be formed at predetermined positions between the outer portion mounted with the outer magnetic substance 22 and the inner support member 21 in the outer yoke 20 (by forming holes at regular intervals), as shown in FIGS. 5A and 5B, in order to reduce the assembly process by integrally forming the upper coil housing with the lower coil housing. That is, the holes are formed in the up-down direction between the connector spokes 24 by spacing the adjacent connector spokes 24 from each other.

Figure 6:
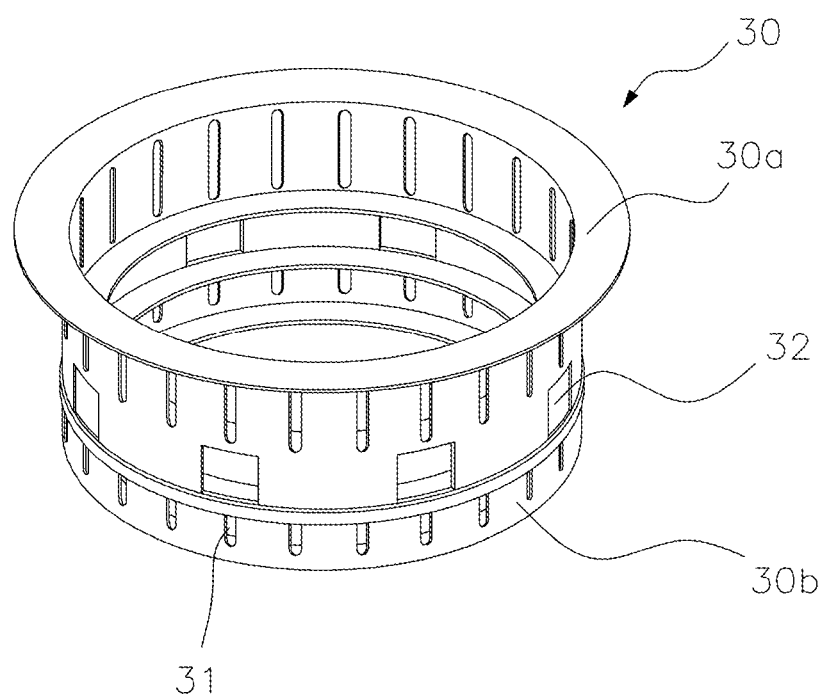
FIG. 6 is a perspective view of a coil housing that is combined with the external yoke shown in FIG. 5A.

Further, ribs 25a or grooves 25b may be formed on the connector spokes 24 for preventing the inner yoke 10 and the outer yoke 20 are disarranged by vibration and reinforcing strength, when the connector spokes 24 are formed as described above. In this configuration, as shown in FIG. 6, fitting grooves 32 are formed at the joint between the upper coil housing 30a and the lower coil housing 30b such that a moving mass vibrating does not interfere with the motion of the connector spokes 24.

Figure 7:
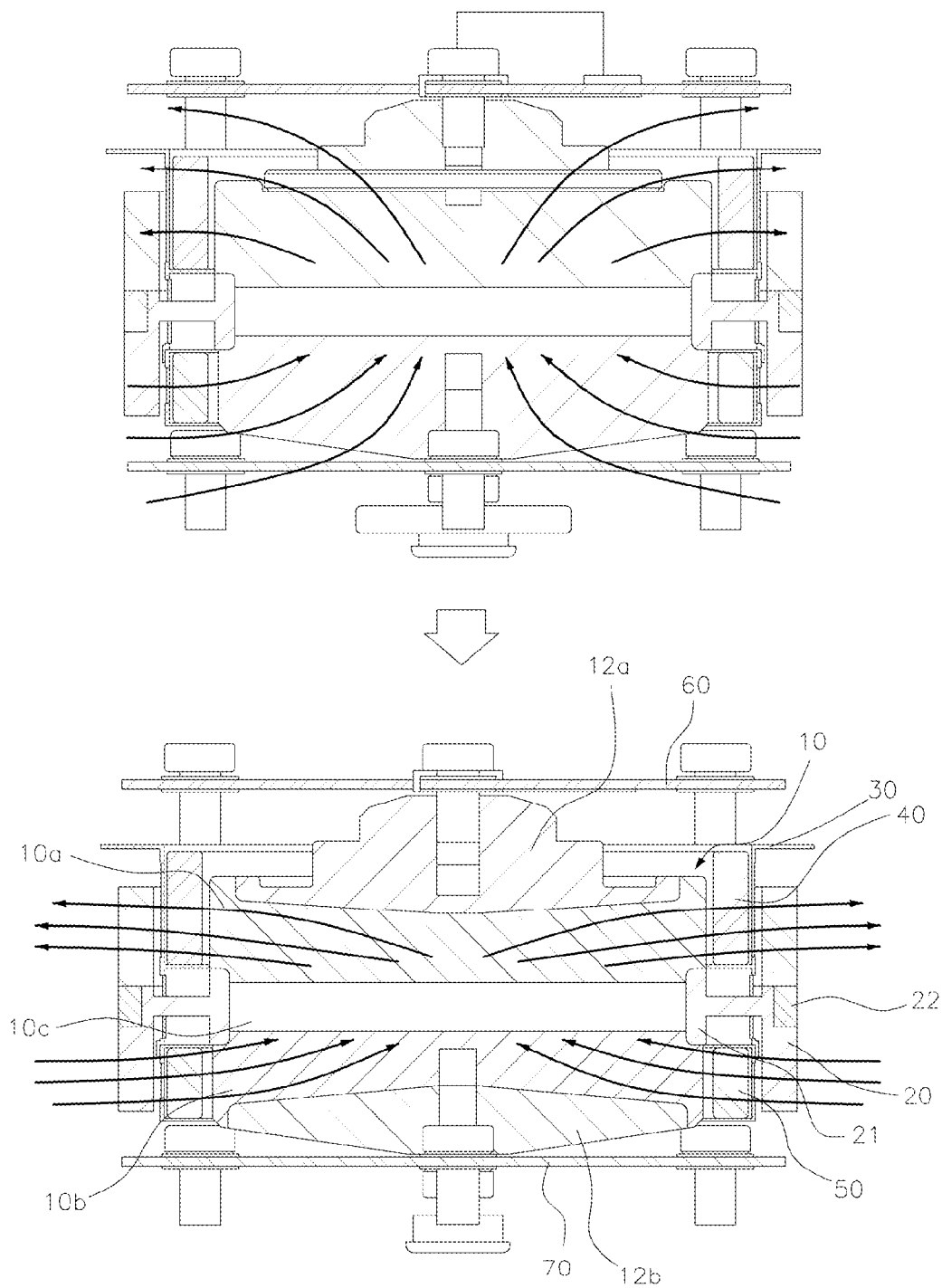
FIG. 7 is a cross-sectional view comparing changes of a magnetic field, when nonmagnetic substances are disposed at the upper end and the lower end of an internal yoke.

On the other hand, as shown in FIG. 7, it is possible to reduce the range where the magnetic field is generated, by using the nonmagnetic substances 12a, 12b for the upper end and the lower end of the yoke assembly, in detail, the upper end and the lower end of the inner yoke 10 where the leaf springs 60, 70 are fastened. It is designed to prevent the magnetic field from influencing the other devices around the vibration absorber, and it is possible to design the nonmagnetic substance in various shapes and sizes, if needed.

The operational state of the vibration absorber according to an exemplary embodiment of the present invention is described hereafter in more detail with reference to the drawings.

Referring to FIG. 2, the upper coil unit 40 and the lower coil unit 50 are supplied with power through the controller or the amplifier, which are described above. Further, the yoke assembly has been magnetized by the inner magnetic substance 10c positioned at the center of the inner yoke 10 and the outer magnetic substance 22 fitted in the outer portion of the outer yoke 20. That is, as described above, in the inner yoke 10, the upper yoke part 10a and the lower yoke part 10b of which the bottom and the top are respectively connected with the inner magnetic substance 10c, which is a permanent magnet, are magnetized with the N-pole at the upside, and the outer yoke 20 has been magnetized with the S-pole at the upside by the outer magnetic substance 22 such that the poles are opposite to those of the inner magnetic substance 10c. It is preferable in this configuration that the inner support member 21 is made of a nonmagnetic substance such that magnetic force lines are formed close to those shown in FIG. 2.

The yoke assembly having this configuration defines a close circuit inside the housing (not shown) and generates the magnetic field indicated by the arrows in FIG. 2.

The inner yoke 10 including the inner magnetic substance 10c and the outer yoke 20 including the outer magnetic substance 22 implement one moving mass, in which inertial force is generated by up/down vibration of the coil units due to current flow, and the inertial force is transmitted to the chassis or the sub-frame, where the housing is mounted, through the upper and lower leaf springs 60, 70.

In detail, the entire yoke assembly is moved by the Lorentz force in the direction of the force in accordance with the direction of current flowing through the upper coil unit 40 and the lower coil unit 50; therefore, driving force that vibrates the yoke assembly is generated by continuously changing the phase of the current flowing through the coil units. That is, the directions of the magnetic fields generated in the coil unit should be opposite to each other at the upper coil unit and the lower coil unit. Therefore, the phases of the current applied to the upper coil unit and the lower coil unit should be controlled to be opposite to each other in order to match the directions of the force generated by the current applied to the upper coil unit and the lower coil unit.

The Lorentz force is proportionate to the wound number of coil, magnetic flux density, the length of the leading wire, and the magnitude of current; therefore, it is possible to control the vibration of the vibration absorber by controlling the magnitude of current and the phase of the current flowing to the upper coil unit and the lower coil unit. In this case, the driving force according to change in the magnetic field is $F_m = m\ddot{x} + c\dot{x} + kx$ (m: mass of moving mass, x: displacement of moving mass, c: attenuation coefficient of spring, k: elastic coefficient of spring). As the moving mass (the entire mass when the outer yoke, inner yoke, and outer magnetic substance are in motion) is moved by the driving force, the inertial force of the moving mass is transmitted to the sub-frame and offsets the engine exciting force. In this operation, the transmitted force substantially attenuating the sub-frame is calculated from $F_T = m\ddot{x}$.

On the other hand, as shown in FIG. 7 for reference, when the insulation members 12a, 12b are disposed at the upper end and the lower end of the inner yoke, it is preferable that the insulation members are nonmagnetic materials having density as large as possible, to prevent decrease of the transmitted force $F_T$ due the reduction of the moving mass.

Further, comparing with the structures of vibration absorbers of the related art, it is preferable to select a material having density as larger as possible than the material of the yoke assembly when selecting a material for the nonmagnetic substances to compensate reduction of the moving mass which may occur at the lower portion in the yoke assembly in order to manufacture the lower coil unit and the lower coil housing.

According to the electromotive active vibration absorber apparatus for a vehicle having the above configuration, since coil units are disposed above and under the yoke assembly, it is possible to more efficiently vibrate the yoke assembly and more easily control the vibration. Further, this effect can be more improved by disposing an outer magnetic substance.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electromotive active vibration absorber apparatus mounted to a vehicle to attenuate vibration of the vehicle, the electromotive active vibration absorber apparatus comprising:
   elastic members mounted to an housing;
   an inner yoke having an upper yoke part and a lower yoke part which are fastened to the elastic members respectively, wherein an inner magnetic substance is disposed between the upper and lower yoke parts; and
   an outer yoke enclosing the inner yoke and having top and bottom portions dented to form inner and outer support members and a connector spoke and receive coil units therein;
   wherein the coil units include an upper coil unit and a lower coil unit, the upper coil unit being mounted above the connector spoke and the lower coil unit being mounted under the connector spoke respectively, between the inner and outer support members of the outer yoke;
   wherein the coil units are controlled to vibrate the inner yoke when power is applied thereto; and
   wherein a fitting groove is formed on the outer circumference of the outer support member and an outer magnetic substance is mounted in the fitting groove such that the inner magnetic substance, the coil units and the outer magnetic substance are disposed in series in a radial direction of the vibration absorber apparatus.

2. The electromotive active vibration absorber apparatus for the vehicle according to claim 1, wherein the connector spoke is a solid connector spoke formed between the inner and outer support members.

3. The electromotive active vibration absorber apparatus for the vehicle according to claim 1, wherein the connector spoke is formed of a plurality of connector spokes formed between the inner and outer support members and holes are formed between the connector spokes.

4. The electromotive active vibration absorber apparatus for the vehicle according to claim 1, wherein the coil units include an upper coil housing and a lower coil housing inserted above and under the connector spoke between the inner and outer support members.

5. The electromotive active vibration absorber apparatus for the vehicle according to claim 4, wherein fitting grooves are formed at a joint between the upper and lower coil housings.

6. The electromotive active vibration absorber apparatus for the vehicle according to claim 1, wherein insulation members are mounted to the upper and lower yoke parts and are fastened to the elastic members.

7. The electromotive active vibration absorber apparatus for the vehicle according to claim 6, wherein the insulation members are made up of nonmagnetic material.

8. The electromotive active vibration absorber apparatus for the vehicle according to claim 1, wherein the connector spoke includes a rib and/or a groove formed at least a surface thereof.

9. An electromotive active vibration absorber apparatus mounted to a vehicle to attenuate vibration of the vehicle, the electromotive active vibration absorber apparatus comprising:
   elastic members mounted to an housing;
   an inner yoke having an upper yoke part and a lower yoke part which are fastened to the elastic members respectively, wherein an inner magnetic substance is disposed between the upper and lower yoke parts; and
   an outer yoke enclosing the inner yoke and having top and bottom portions dented to form inner and outer support members and a connector spoke and receive coil units therein;
   wherein the coil units include an upper coil unit and a lower coil unit, the upper coil unit being mounted above the connector spoke and the lower coil unit being mounted under the connector spoke respectively, between the inner and outer support members of the outer yoke;
   wherein the coil units are controlled to vibrate the inner yoke when power is applied thereto;
   wherein the coil units include an upper coil housing and a lower coil housing inserted above and under the connector spoke between the inner and outer support members; and
   wherein the upper coil housing has a plurality of holes formed through a lateral surface thereof.

10. The electromotive active vibration absorber apparatus for the vehicle according to claim 9, wherein the plurality of holes are formed through the lateral surface thereof in a length ranging above the height of the outer support member.

11. The electromotive active vibration absorber apparatus for the vehicle according to claim 9, wherein the lower coil housing has a plurality of holes formed through a lateral surface thereof.

12. An electromotive active vibration absorber apparatus mounted to a vehicle to attenuate vibration of the vehicle, the electromotive active vibration absorber apparatus comprising:
   elastic members mounted to an housing;
   an inner yoke having an upper yoke part and a lower yoke part which are fastened to the elastic members respectively, wherein an inner magnetic substance is disposed between the upper and lower yoke parts; and
   an outer yoke enclosing the inner yoke and having top and bottom portions dented to form inner and outer support members and a connector spoke and receive coil units therein,
   wherein the coil units include an upper coil unit and a lower coil unit, the upper coil unit being mounted above the connector spoke and the lower coil unit being mounted under the connector spoke respectively, between the inner and outer support members of the outer yoke;
   wherein the coil units are controlled to vibrate the inner yoke when power is applied thereto; and
   wherein the outer yoke is made up of nonmagnetic material.

* * * * *